United States Patent [19]

Mack

[11] Patent Number: 5,487,342

[45] Date of Patent: Jan. 30, 1996

[54] STOWAWAY TABLE

[76] Inventor: Henry J. Mack, 82 Firtree Rd., Levittown, Pa. 19056

[21] Appl. No.: 312,474

[22] Filed: Sep. 26, 1994

[51] Int. Cl.$^6$ ..................................................... A47B 23/00
[52] U.S. Cl. .............................................. 108/42; 108/40
[58] Field of Search ................................ 108/42, 47, 48, 108/44, 46, 37, 40, 147

[56] References Cited

U.S. PATENT DOCUMENTS

| | | | |
|---|---|---|---|
| 3,062,544 | 11/1962 | Viets | 108/48 X |
| 3,140,559 | 7/1964 | Grow et al. | 108/147 X |
| 3,680,942 | 8/1972 | Davis | 108/48 X |
| 5,086,527 | 2/1992 | Takahashi et al. | 108/42 X |
| 5,381,738 | 1/1995 | Meyer | 108/42 X |

FOREIGN PATENT DOCUMENTS

| | | | |
|---|---|---|---|
| 3312892 | 3/1984 | Germany | 108/40 |
| 685131 | 3/1965 | Italy | 108/40 |

*Primary Examiner*—Jose V. Chen
*Attorney, Agent, or Firm*—Morgan & Finnegan

[57] ABSTRACT

A stowaway table is used in closely confined areas such as the interior of an airplane and has a support frame with lower, upper and side frame sections defining a table storage area. A guide track having upper and lower ends is mounted to the frame. A table leaf has upper and lower ends and is dimensioned to be contained within the table storage area. The table leaf is mounted at its lower end for movement along the guide track. When the table leaf is at the lower guide track, the table leaf is positioned in a stowed position. When the table leaf is at the upper position of the guide track, the table leaf is outwardly extending from the support frame in a raised horizontal position. A strut has opposing ends and is pivotally mounted at one end to the lower frame section and at the other end to the upper end of the table leaf. The strut includes a plunger which biases the upper end of the table leaf upward and outward from the frame a sufficient distance to allow movement of the lower end of the table leaf upward along the guide track to allow pivoting movement of the table leaf into a raised horizontal position. The strut also aids in supporting the table leaf in its raised position.

34 Claims, 6 Drawing Sheets

STOWAWAY TABLE

FIELD OF INVENTION

This invention relates to a stowaway table for use such as in closely confined areas such as the interior of an airplane, and more particularly to a stowaway table having a table leaf that pivots outward from a frame and a strut to aid in supporting the table leaf in its raised, horizontal position.

BACKGROUND OF THE INVENTION

In closely confined areas such as in the interior of an airplane, a recreational vehicle or other similar confined areas, any table used in the area is desirably small and when the table is not in use, it is desirably stored in a stowed position, such as against the wall. When the table is needed, it is set-up, used and then stowed away when finished.

Typically, these stowed tables pivot or move outward from a position where the table is mounted flush with a side panel or wall. In those locations such as a corporate jet or expensive recreational vehicle, the stowaway table should lie substantially flush with a side wall panel and be easily maneuverable into a raised, horizontal position with minimal user effort. Once raised, the table should be structurally sound and then easily revertible to its stowed position.

Many previously designed stowaway tables are not feasible for use in the expensive, higher quality surroundings such as a corporate jet. Many of these tables have minimal structural support or require manipulation of a support once the table is raised into its horizontal position. Sometimes, an excessive number of manual table setup steps are required for moving the table into its horizontal, raised position. In some designs, the table is raised and then a support or table itself is adjusted to lock the table in a fixed position.

For example, some stowaway tables require that the table be moved laterally into a locked position after the table is already raised. Other stowaway tables require that support legs be moved outward into a supporting position under the table. These additional steps are bothersome to the user and can be frustrating in the close confines of a business setting of a corporate jet.

It is therefore desirable if a stowaway table could be moved into its raised position in one motion, and preferably also locked in that position with the same motion. It would also be desirable if a stowaway table could not only be raised in one motion, but also reverted back into a stowed position with little difficulty.

SUMMARY OF THE INVENTION

In accordance with the present invention, a support frame has lower, upper and side frame sections which define a table storage area of substantially rectangular configuration.

A guide track is mounted to the frame and the track includes upper and lower ends. A table leaf has opposing upper and lower ends and is dimensioned for being contained within the table storage area when the table is stowed. In this stored position, the table is substantially flush with the frame sections.

The table leaf is mounted at its lower end for movement of the lower end of the table along the guide track. When the lower end of the table leaf is at the lower end of the guide track, the table leaf is in a stowed position within the table storage area. As the lower end of the table leaf is raised upward along the upper guide track, the table leaf pivots into a horizontally and outwardly extending raised position from the support frame.

A strut has opposing ends and is pivotally mounted at one end to the lower frame section. The other strut end is mounted to the upper end of the table leaf. When stowed, the table leaf is retained in its stowed position by the upper edge of the table leaf engaging a stop member on the upper frame section. The strut includes means for biasing the upper end of the table leaf upward and outward from the frame a sufficient distance when the table leaf is initially pulled so as to allow movement of the table lower end upward along the guide track and allow pivoting movement of the table leaf into a horizontal, raised position. The strut aids in supporting the table leaf in its raised position.

The means for biasing the upper end of the table leaf by the strut comprises a plunger mounted within the strut at its upper end. The plunger is biased outward for moving the upper end of the table leaf a predetermined distance upward and outward from the frame. The plunger in one aspect of the invention is gas actuated.

A latch is mounted on the table leaf and a latch receiver is mounted on the frame. The latch enters the latch receiver when the table leaf is pivoted into its raised position to lock the table. A release handle is mounted on the table leaf and actuates the latch into locked and unlocked positions.

The stowaway table also includes a biasing assembly for biasing the table upward along the guide track as the table pivots into its raised, horizontal position. The guide track includes a fixed gear rack and the table leaf includes a pinion gear which meshes with the fixed gear rack. A tensioner spring imparts a rotative force to the pinion so that the pinion is biased along the gear rack to assist in moving the table leaf upward as the table leaf is manually and pivotally raised. A springwire engages the tensioner spring with the table leaf.

In another aspect of the present invention, a leaf extension is pivotally connected to the upper end of the table leaf and pivots 180 degrees into an extended position substantially coplanar with the table leaf. The leaf extension is positioned inward of the table leaf within the frame when the table leaf is in its stowed position.

BRIEF DESCRIPTION OF THE DRAWINGS

The foregoing features and advantages of the present invention will be appreciated more fully from the following description, with references to the accompanying drawings in which.

DETAILED DESCRIPTION

Figure 1:
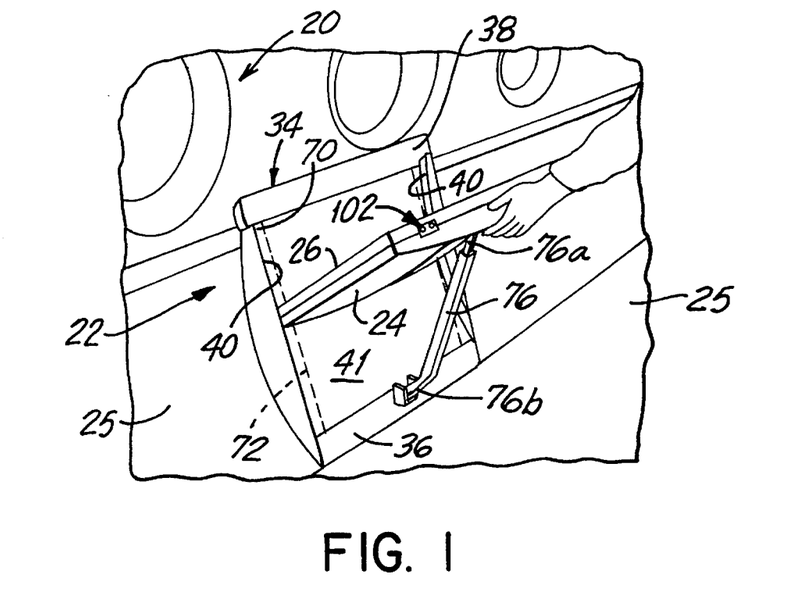
FIG. 1 is an isometric view within a corporate jet showing a user initially pivoting the stowaway table of the present invention into a partially raised position.
Figure 2:
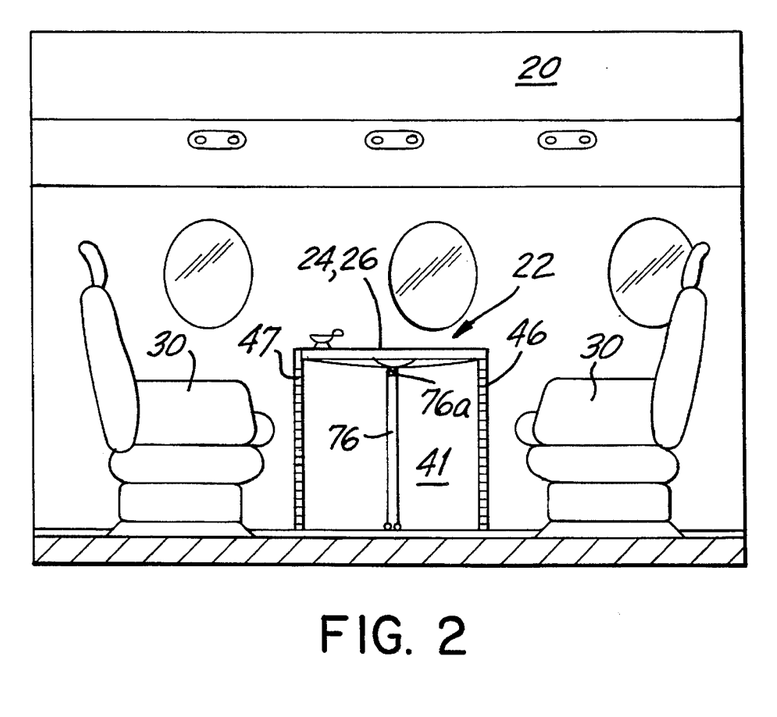
FIG. 2 is a side elevation view showing the interior of a corporate jet and the stowaway table of the present invention locked into its raised, horizontal position.
Figure 3:
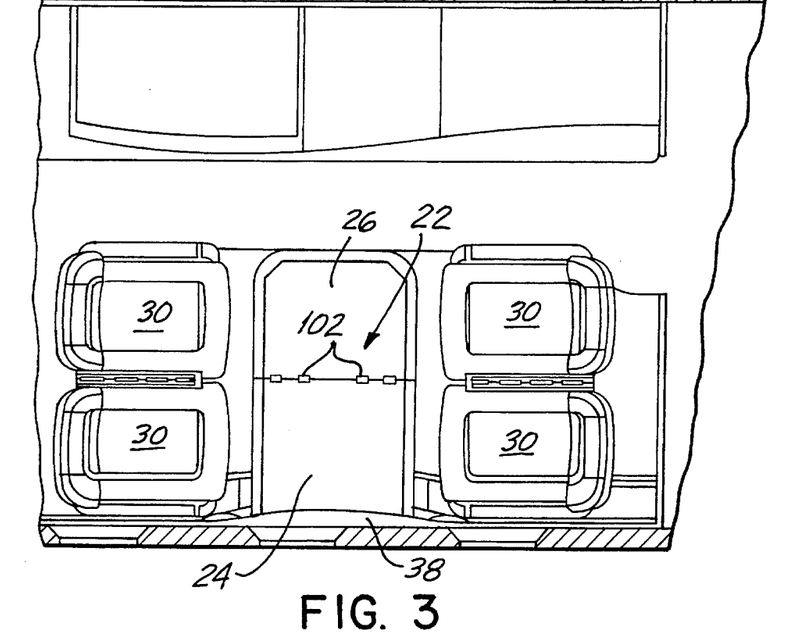
FIG. 3 is a plan view of the corporate jet of FIG. 2 showing the stowaway table of the present invention in its raised, horizontal position and the leaf extension pivoted 180 degrees into its extended, coplanar position with the table leaf.
Figure 5:
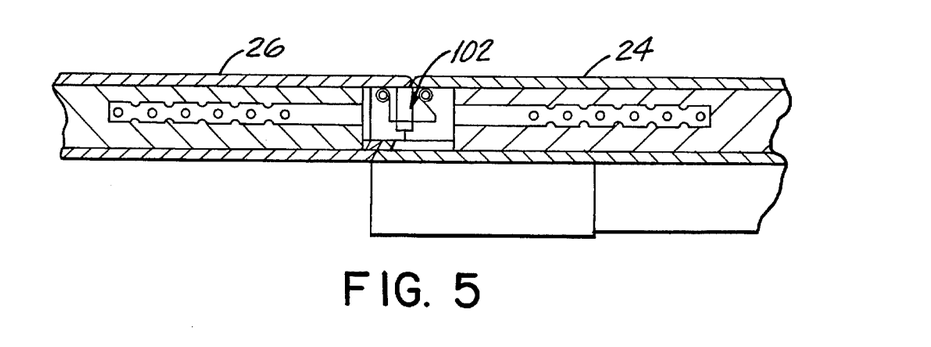
FIG. 5 is a schematic, side sectional view showing the leaf extension pivoted into its extended position substantially coplanar with the table leaf.

Referring now to the drawings, and more particularly, to FIG. 1, there is illustrated the interior of a jet 20 having the stowaway table of the present invention, indicated generally at 22. As shown in FIGS. 1 and 10–14, the stowaway table 22 is stored in a stowed, closed position where its main table leaf 24 is substantially flush with the side wall panel 25 of the jet interior and is pivoted upward and outward (FIGS. 11–12) into a raised, horizontal position (FIG. 13). A leaf extension 26 is then pivoted into an extended, substantially coplanar position with the table leaf 24 (FIGS. 3 and 5). As shown in FIG. 3, the stowaway table 22 of the present invention can be mounted on the interior wall of the jet or recreational vehicle between opposing seats 30.

Figure 8:
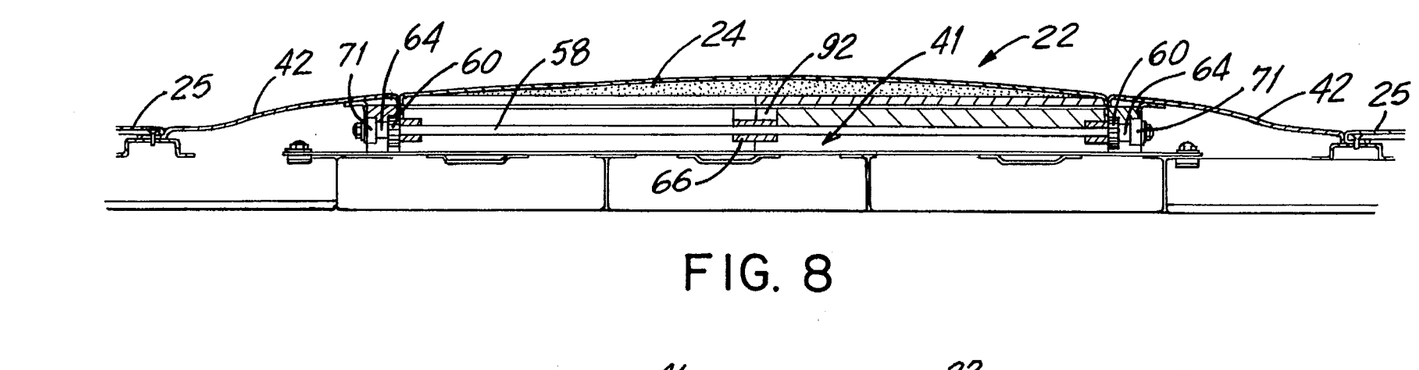
FIG. 8 is a sectional view of the table leaf is its stowed position taken substantially along line 8—8 of FIG. 7.

The stowaway table 22 includes a support frame, indicated generally at 34, having a lower frame section 36, an upper frame section 38 and side frame sections 40 which as shown in FIG. 8 include a side frame panel 42 which curves gently toward the side wall panel 25 defined by the interior of the jet, recreational vehicle or other location in which the frame 34 is mounted. The frame sections 36, 38, 40 form a substantially rectangular configured enclosure or table storage area 41, where the main table leaf 24 and leaf extension 36 are stored. FIG. 1 illustrates the frame assembly 34 without the curved frame side panels sections 42. As illustrated, the front edges of the upper, lower and side frame sections 38, 36, and 40 form a substantially coplanar outline as shown in FIG. 1. Thus, the frame 34 can be mounted so that the coplanar front edges are flush with the side wall panel 25 or slightly offset as illustrated in the drawings with side frame panels 42 gently curving toward the side wall panels 25 so that the frame is substantially coplanar with the panels 25.

A guide track is formed from the two parallel, spaced bearing tracks 46, 47 and is mounted to the frame 34. Each track 46, 47 has upper and lower ends, and juxtaposed fixed gear racks 48, 49 mounted adjacent to the bearing tracks 46, 47.

The table leaf 24 has opposing upper and lower ends 24a, 24b and is dimensioned for being contained within the table storage area 41 defined by the support frame sections 34, 36, and 38. As shown in FIG. 8, the lower end 24b of the table leaf includes an axle 58 extending horizontally through the lower end 24b and outward from the side. Each end of the axle 58 has a pinion gear 60 mounted thereto. Each pinion gear 60 engages with the respective gear racks 48, 49. The bearing tracks 46, 47 are dimensioned to engage a bearing 64. The side frame member 40 helps hold the pinions 60 against the rack 48, 49. Each pinion gear 60 meshes with its respective gear rack 48, 49. A central bearing 66 is mounted within the table leaf 24 and aids in rotatively supporting the axle 58 within the lower end of the table leaf.

Figure 9:
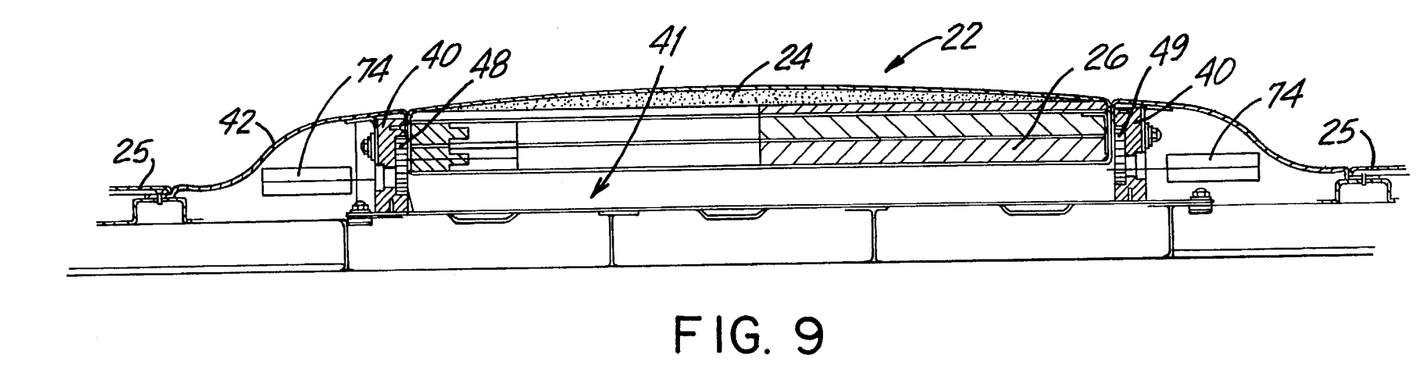
FIG. 9 is a sectional view of the table leaf and its leaf extension in the stowed position taken substantially along line 9—9 of FIG. 7.
Figure 10:
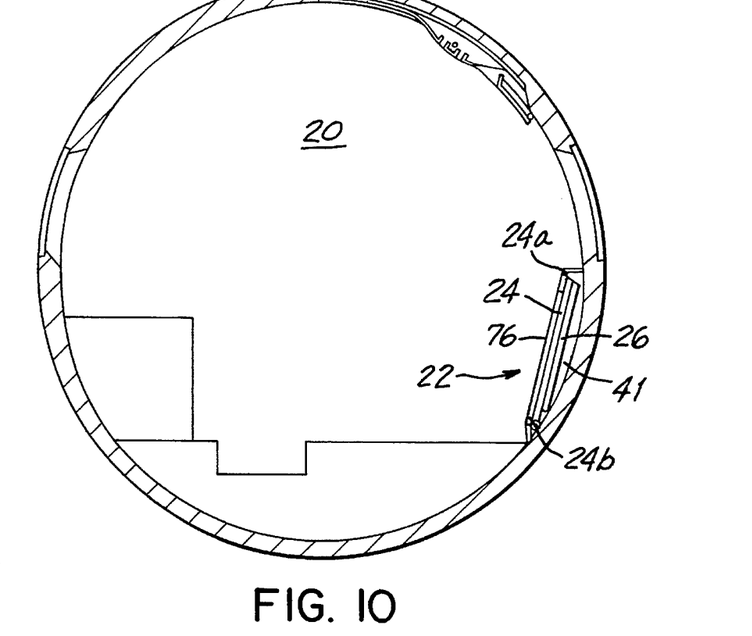
FIGS. 10 through 13 illustrate the various steps of pivoting the table into its horizontal, raised position.
Figure 11:
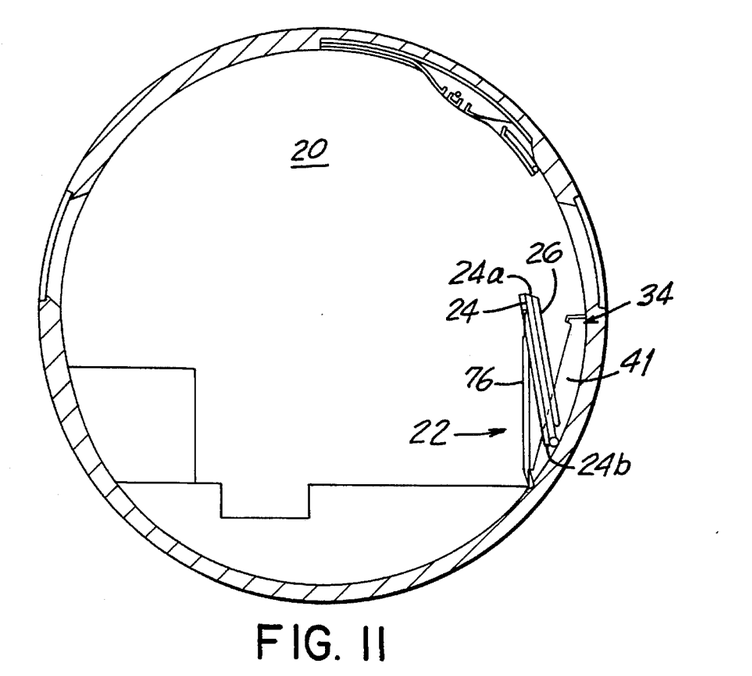

As shown in FIGS. 1, 8 and 9 a wire cable 70 is operatively connected to a lifting block 71 which is connected to the pinion gear 60 of the table leaf 24. The wire cable 70 runs over a pulley system 72 (FIG. 1) to a spring tensioner assembly 74. The spring tensioner assembly 74 imparts a rotative biasing force to the pinion gear 60 via the lifting block to aid in moving the table leaf lower ends 24b upward along the rack and pinion gear systems so as to position the table leaf in its raised, horizontal position. The wire cable 70 can also be a flat ribbon.

Figures 6, 7:
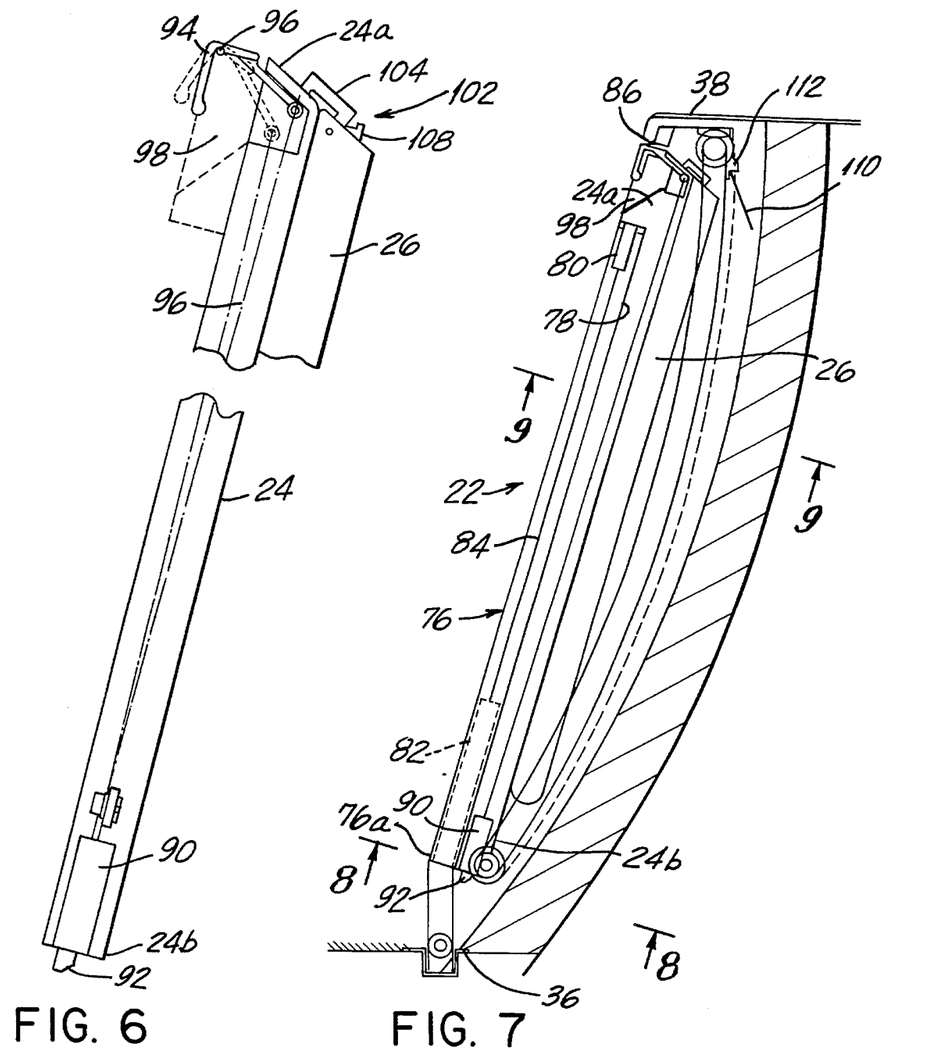
FIG. 6 is a schematic, side sectional view of the table leaf showing the handle and latch assembly.
FIG. 7 is a schematic, side sectional view of the table leaf and its leaf extension in the stowed position.

Referring now to FIGS. 1 and 7, greater details of the support mechanism that helps to maintain the table leaf 24 in its raised, horizontal position is illustrated. A strut 76 has opposing ends and is pivotally mounted at a lower strut end 76a to the lower frame section 36 and is mounted at its upper end 76b to the upper end 24a of the table leaf 24. When the table leaf 24 is in its closed, stowed position, the strut 76 is positioned within a receiving slot 78 on the table leaf 24. The side containing the receiving slot 78 becomes the underside of the stowaway table when the table leaf 24 is moved into its horizontal, raised position.

The strut 76 is formed as a hollow tube and a plunger 80 is mounted within the upper end of the strut 80. A gas actuated cylinder 82 is operatively connected to the plunger via a push rod 84. The gas actuated cylinder 82 exerts a biasing force outward on the plunger and a corresponding upward force is exerted on the table leaf 74.

As shown in FIG. 7, when the table leaf 24 is in its closed, stowed position, the upper end 24b of the table leaf engages a stop member 86 positioned on the upper frame member 34, which prevents gas actuated cylinder 82 from biasing the table leaf 24 upward and outward from the frame 34.

As shown in FIGS. 6 and 7, a latch assembly 90 is mounted at the lower end 24b of the table leaf 24 and includes a latch member 92 which may be moved in and out of the lower end by engaging a release handle 94 mounted on the upper end 24a of the table leaf 24. The release handle 94 is mounted at a pivot point 86 located at the upper corner of the table leaf. A finger cutout 98 is positioned in the table leaf so that the release handle 94 can be grasped manually with little difficulty.

Figure 4:
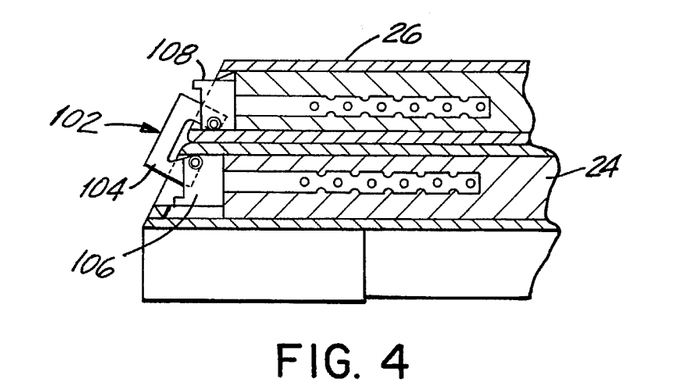
FIG. 4 is a schematic side sectional view showing the hinge connection between the table leaf and its leaf extension.

A leaf extension 100 is pivotally connected to the upper end 24a of the table leaf 24 as shown in FIGS. 4, 5 and 7. A hinge assembly, indicated generally at 102, includes a rectangular configured hinge member 104 and rectangular configured hinge receivers 106, 108 mounted on a respective table leaf and extension. These receivers 106, 108 are dimensioned to receive the hinge member and form a secure, stable, table top surface when the leaf extension is pivoted 180 degrees into its extended position (FIG. 13).

In operation, the release handle 94 is initially grasped by a user when the stowaway table is to be used. As the user pulls outward on the release handle 94, the upper end 24a of the table leaf 24 is moved outward from the stop member located at the upper frame section 38. At this time, the gas actuated plunger 80 forces the upper end 24a of the table leaf upward and outward a predetermined distance, typically a few inches. This action of the plunger 80 effectively lengthens the strut 76 so that the table leaf can now be pivoted upward and outwardly as shown in FIG. 12.

The wire cable 70 connected to the tensioner assembly 74 also imparts a biasing force on the lifting block connected to the pinion gear 60 to help rotate the pinion gears as the table leaf 24 is pivoted to facilitate further pivoting action of the table leaf into its raised position. Once the table is initially raised into its raised position as shown in FIG. 13, the handle is released and the latch member 92 engages a latch striker plate 110 and moves into a latch receiving notch 112 (FIG. 7) to lock the table leaf in its raised, horizontal position. At this time, the strut 76 supports the table leaf at its outer end. The distance the plunger 80 extends determines the height of the table end, and thus is preset so that the table is horizontally positioned when raised. The leaf extension 26 then is pivoted 180 degrees so that the rectangular configured hinge member 104 has opposing rectangular-configured ends received in the hinge receivers 106, 108 and locked in that position.

Figure 12:
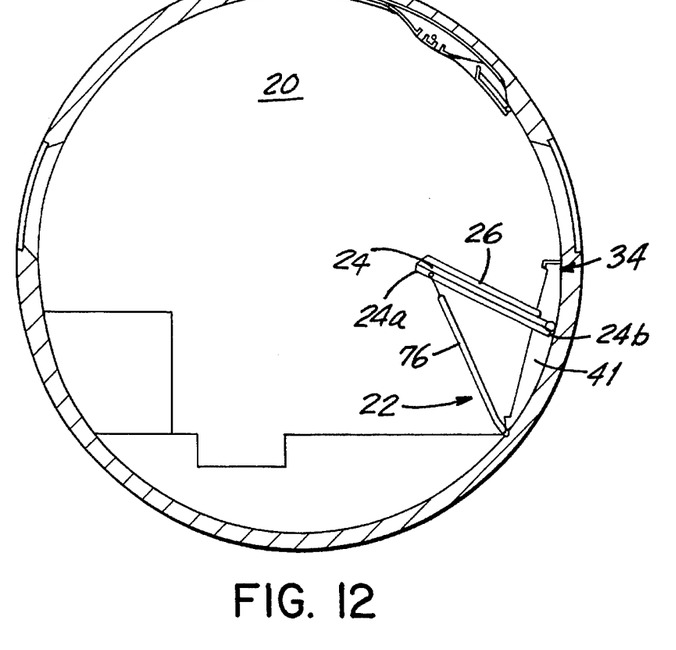
Figure 13:
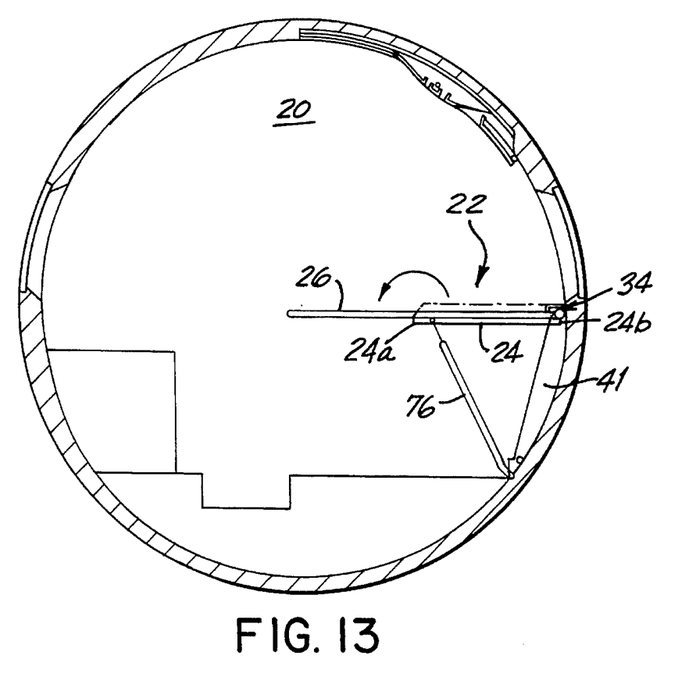

The table can be easily stowed away by first pivoting the leaf extension 180 degrees into the position shown in FIG. 12, and then pushing against the upper edge of the table leaf so that the lower end of the table leaf is forced downward along the guide track, thus tensioning the spring tensioner as the pinion gear rotates while it is enmeshed with the gear rack. Once the table is completely pushed into the table receiving area 41, the upper edge of the table leaf 24 engages the stop member 86, which retains the table leaf and extension 24, 26 in the stowed position.

It should be understood that the foregoing description of the invention is intended merely to be illustrative thereof, and that other embodiments, modifications and equivalents may be apparent to those skilled in the art without departing from its spirit.

That which is claimed is:

1. A stowaway table for use such as in closely confined areas such as the interior of an airplane comprising
   a support frame defining a table storage area,
   a guide mounted to the frame, having upper and lower ends,
   a table leaf having upper and lower ends and dimensioned for being contained within said table storage area,
   means mounting said table leaf at its lower end for movement along said guide, wherein said table leaf is positioned in a stowed position within said table storage area when the mounted end of the table leaf is at the lower guide end, and said table leaf is horizontally and outwardly extending from said support frame and in a raised position when the mounted end of the table leaf is at the upper end of the guide, and
   a strut having opposing ends, and pivotally mounted at one end to said frame and mounted at the other end to said upper end of said table leaf, said strut including means mounted on the strut and interconnecting said leaf for biasing said upper end of said table leaf upward and outward from said frame and table storage area a sufficient distance when said table leaf is initially to be raised to allow movement of said table lower end upward along said guide and pivoting movement of said table leaf into a horizontal, raised position, wherein said strut aids in supporting the table leaf when it is positioned in its horizontally raised position.

2. A stowaway table according to claim 1 including means mounted on the support frame and engaging said table leaf for biasing the table leaf upward along the guide as the table leaf pivots into its horizontal position.

3. A stowaway table according to claim 2 wherein said means mounted on said frame for biasing said table leaf upward along said guide includes a tensioner spring mounted on the frame, and means operatively connecting said tensioner spring to said table leaf.

4. A stowaway table according to claim 3 wherein said means operatively connecting said tensioner spring to said table leaf comprises a wire.

5. A stowaway table according to claim 1 wherein said guide includes a fixed gear rack, and said table leaf includes a pinion gear rotatably mounted thereon which meshes with said fixed gear rack, and tensioner means mounted on said frame and interconnecting said pinion gear for imparting a rotative force to said pinion gear to assist in moving said table leaf upward along said guide into the raised, horizontal position.

6. A stowaway table according to claim 1 including a leaf extension pivotally connected to the upper end of the table leaf wherein said leaf extension pivots into an extended position coplanar with said table leaf to form an enlarged table surface.

7. A stowaway table according to claim 6 wherein said leaf extension is positioned inward of said table leaf within said table storage area when the table leaf is in its stowed position.

8. A stowaway table according to claim 1 wherein said means for biasing said upper end of said table leaf by said strut comprises a plunger mounted within said strut at its upper end, and means for biasing said plunger outward for moving said upper end of said table leaf a predetermined distance upward and outward from said frame.

9. A stowaway table according to claim 8 wherein said plunger is gas actuated.

10. A stowaway table according to claim 1 wherein the upper end of said table leaf engages said frame in the stowed position to prevent said table leaf from biasing outward so as to retain said table leaf in its stowed position.

11. A stowaway table according to claim 1 including a latch mounted on said table leaf, and a latch receiver mounted on said frame for receiving said latch into a locked position when said table leaf is in its raised horizontal position.

12. A stowaway table according to claim 11 including a handle mounted on said table leaf for actuating said latch into locked and unlocked positions.

13. A stowaway table for use such as in closely confined areas such as the interior of an airplane comprising
   a support frame having upper, lower, and two opposing side frame sections to define a substantially rectangular configured table storage area,
   a pair of substantially parallel guide tracks fixed to said support frame, each guide track being mounted adjacent a side frame section and extending from the lower to the upper frame section, each guide track including a fixed gear rack and a bearing track extending along the guide track,
   a table leaf having upper and lower ends and dimensioned for being contained within said table storage area,
   means mounting said table leaf at its lower end for movement along said guide track, said table leaf including respective pinion gears and bearings rotatably mounted thereon and mounted at the lower end of the table leaf and meshing with the respective fixed gear rack and bearing track, and wherein said table leaf is positioned in a stowed position within said table storage area when the mounted end of the table leaf is at the lower guide track end, and said table leaf is horizontally and outwardly extending from said support frame and in a raised position when the mounted end of the table leaf is at the upper end of the guide track,
   means mounted on the frame and interconnecting said pinion gears for imparting a rotative force to said pinion gears to assist in moving said table leaf upward, and
   means mounted to said lower frame section and said upper end of said table leaf for supporting said table leaf in a raised position.

14. A stowaway table according to claim 13 wherein said means for imparting a rotative force to said pinion gears include a tensioner spring mounted on said frame, and means operatively connecting said tensioner spring to said pinion gears.

15. A stowaway table according to claim 14 wherein said means operatively connecting said tensioner spring to each of said pinion gears comprises a wire.

16. A stowaway table according to claim 13 including a leaf extension pivotally connected to the upper end of the table leaf wherein said leaf extension pivots into an extended position coplanar with said table leaf to form an enlarged table surface.

17. A stowaway table according to claim 16 wherein said leaf extension is positioned inward of said table leaf within said table storage area when the table leaf is in its stowed position.

18. A stowaway table according to claim 13 wherein said means for supporting said table leaf in the raised horizontal position comprises a strut.

19. A stowaway table according to claim 18 wherein said strut includes a plunger mounted within said strut at its upper end, and means for biasing said plunger outward for moving said upper end of said table leaf a predetermined distance upward and outward from said frame.

20. A stowaway table according to claim 19 wherein said plunger is gas actuated.

21. A stowaway table according to claim 13 wherein the upper end of said table leaf engages said upper frame section in the stowed position to prevent said table leaf from biasing outward so as to retain said table leaf in its stowed position.

22. A stowaway table according to claim 13 including a latch mounted on said table leaf, and a latch receiver mounted on said frame for receiving said latch into a locked position when said table leaf is in its raised horizontal position.

23. A stowaway table according to claim 22 including a handle mounted on said table leaf for actuating said latch into locked and unlocked positions.

24. A stowaway table for use such as in closely confined areas such as the interior of an airplane comprising a support frame defining a table storage area, a pair of vertically extending guide tracks fixed to said frame, each guide track including a fixed gear rack, a table leaf having upper and lower ends and dimensioned for being contained within said table storage area, means mounting said table leaf at its lower end for movement along said guide track, said table leaf including respective pinion gears rotatably mounted at the lower end of the table leaf which mesh with the fixed gear rack, said table leaf being movable from a stowed position within said table storage area to a raised position where the table leaf is horizontally and outwardly extending from said support frame, means mounted on the frame and interconnecting said pinion gears for imparting a rotative force to said pinion gears to assist in moving said table leaf upward, and a strut having one end mounted to said frame and the other end mounted to said upper end of said table leaf for supporting said table leaf in a raised position, said strut including a plunger mounted within said strut and means for biasing said plunger outward for moving said upper end of said table leaf a predetermined distance upward and outward from said frame.

25. A stowaway table according to claim 24 wherein said means for imparting a rotative force to said pinion gears include a tensioner spring, and means operatively connecting said tensioner spring to said pinion gears.

26. A stowaway table according to claim 25 wherein said means operatively connecting said tensioner spring to said pinion comprises a wire.

27. A stowaway table according to claim 24 including a leaf extension pivotally connected to the upper end of the table leaf wherein said leaf extension pivots into an extended position coplanar with said table leaf to form an enlarged table surface.

28. A stowaway table according to claim 27 wherein said leaf extension is positioned inward of said table leaf within said table storage area when the table leaf is in its stowed position.

29. A stowaway table according to claim 24 wherein said means for supporting said table leaf in the raised horizontal position comprises a strut.

30. A stowaway table according to claim 29 wherein said strut includes a plunger mounted within said strut at its upper end, and means for biasing said plunger outward for moving said upper end of said table leaf a predetermined distance upward and outward from said frame.

31. A stowaway table according to claim 30 wherein said plunger is gas actuated.

32. A stowaway table according to claim 24 wherein the upper end of said table leaf engages said upper frame section in the stowed position to prevent said table leaf from biasing outward so as to retain said table leaf in its stowed position.

33. A stowaway table according to claim 24 including a latch mounted on said table leaf, and a latch receiver mounted on said frame for receiving said latch into a locked position when said table leaf is in its raised horizontal position.

34. A stowaway table according to claim 33 including a handle mounted on said table leaf for actuating said latch into locked and unlocked positions.

* * * * *

UNITED STATES PATENT AND TRADEMARK OFFICE
CERTIFICATE OF CORRECTION

PATENT NO. : 5,487,342
DATED : January 30, 1996
INVENTOR(S) : Henry J. Mack

It is certified that error appears in the above-indentified patent and that said Letters Patent is hereby corrected as shown below:

At Column 4, line 51, after "stop member" insert --86--.

Signed and Sealed this

Twenty-third Day of April, 1996

Attest:

BRUCE LEHMAN

Attesting Officer

Commissioner of Patents and Trademarks